(12) United States Patent
Shiromura et al.

(10) Patent No.: US 9,308,805 B2
(45) Date of Patent: Apr. 12, 2016

(54) VEHICLE REAR STRUCTURE

(71) Applicant: SUZUKI MOTOR CORPORATION, Hamamatsu (JP)

(72) Inventors: Hiroyasu Shiromura, Hamamatsu (JP); Hideyuki Tamaki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 364 days.

(21) Appl. No.: 13/906,087

(22) Filed: May 30, 2013

(65) Prior Publication Data

US 2014/0008137 A1  Jan. 9, 2014

(30) Foreign Application Priority Data

Jul. 5, 2012 (JP) .................. 2012-151763

(51) Int. Cl.
| | |
|---|---|
| *B62D 25/08* | (2006.01) |
| *B60K 15/063* | (2006.01) |
| *B60K 1/04* | (2006.01) |
| *B60L 3/00* | (2006.01) |
| *B60L 11/18* | (2006.01) |

(52) U.S. Cl.
CPC ................ *B60K 1/04* (2013.01); *B60L 3/0007* (2013.01); *B60L 3/0046* (2013.01); *B60L 11/1864* (2013.01); *B60L 11/1877* (2013.01); *B60L 11/1879* (2013.01); *B62D 25/087* (2013.01); *B60K 2001/0416* (2013.01); *B60K 2001/0438* (2013.01); *B60L 2210/10* (2013.01); *B60L 2210/30* (2013.01); *B60L 2270/145* (2013.01); *B60Y 2306/01* (2013.01); *Y02T 10/7005* (2013.01); *Y02T 10/7061* (2013.01); *Y02T 10/7216* (2013.01); *Y02T 10/7241* (2013.01); *Y10S 903/952* (2013.01)

(58) Field of Classification Search
CPC .............. B60K 2001/0405; B60K 2001/0433; B60K 2001/0438; B60K 2001/0416; B62D 21/11; B62D 21/09; B62D 21/02; B62D 25/087; B62D 25/088; B62D 25/2027
See application file for complete search history.

(56) References Cited

U.S. PATENT DOCUMENTS

| | | | | |
|---|---|---|---|---|
| 5,573,222 A | * | 11/1996 | Ruehl et al. .................... | 248/647 |
| 6,357,769 B1 | * | 3/2002 | Omundson et al. .... | 280/124.109 |
| 7,051,825 B2 | * | 5/2006 | Masui et al. .................. | 180/68.5 |

(Continued)

FOREIGN PATENT DOCUMENTS

| | | |
|---|---|---|
| CN | 1874051 | 12/2006 |
| CN | 201208897 | 3/2009 |

(Continued)

*Primary Examiner* — Joseph Rocca
*Assistant Examiner* — Travis Coolman
(74) *Attorney, Agent, or Firm* — Silicon Valley Patent Group LLP

(57) ABSTRACT

A vehicle rear structure protects a battery unit in a rear-end collision. The vehicle rear structure has a battery unit positioned behind a torsion beam; first and second cross members spanning between side members; a frame member that supports the battery unit; a bridge member spanning from the first cross member to the second cross member, and connected at a rear flange to the second cross member; and reinforcements that are respectively disposed to the side members and reinforce the side members from the front edge to the rear edge of the second cross member. The torsion beam is positioned near directly below the second cross member. The side members slope down to the front from the front end part of the reinforcement.

5 Claims, 8 Drawing Sheets

(56) References Cited

U.S. PATENT DOCUMENTS

| | | | |
|---|---|---|---|
| 7,503,585 B2 * | 3/2009 | Hashimura et al. | 280/782 |
| 7,552,963 B2 * | 6/2009 | Yamaguchi et al. | 296/187.08 |
| 7,631,918 B2 * | 12/2009 | Yasukouchi et al. | 296/30 |
| 8,286,319 B2 * | 10/2012 | Stolle et al. | 29/421.1 |
| 8,308,193 B2 * | 11/2012 | Lux et al. | 280/785 |
| 8,328,272 B2 * | 12/2012 | Fujimura | 296/187.11 |
| 8,403,096 B2 * | 3/2013 | Taguchi et al. | 180/291 |
| 8,567,543 B2 * | 10/2013 | Kubota et al. | 180/68.5 |
| 8,584,779 B2 * | 11/2013 | Tsuchiya et al. | 180/68.5 |
| 8,631,886 B2 * | 1/2014 | Kawamura | 180/65.22 |
| 8,863,877 B2 * | 10/2014 | Saeki | 180/68.5 |
| 9,022,152 B2 * | 5/2015 | Imamura et al. | 180/68.5 |
| 2012/0129440 A1 * | 5/2012 | Kitaguchi et al. | 454/120 |
| 2012/0175177 A1 * | 7/2012 | Lee et al. | 180/68.5 |
| 2013/0020139 A1 * | 1/2013 | Kim et al. | 180/68.5 |

FOREIGN PATENT DOCUMENTS

| | | |
|---|---|---|
| CN | 102113149 | 6/2011 |
| JP | 2006-205810 | 8/2006 |
| JP | 4810971 | 11/2011 |
| WO | 2012086297 | 6/2012 |

* cited by examiner

VEHICLE REAR STRUCTURE

CROSS-REFERENCE TO PENDING PROVISIONAL APPLICATION

This application claims the benefit of and priority to Japanese Application No. 2012-151763 filed Jul. 5, 2012 and entitled "Vehicle rear structure", which is assigned to the assignee hereof and which is incorporated herein by reference.

FIELD

This disclosure relates to a vehicle rear structure for hybrid vehicles or electric vehicles.

BACKGROUND

Hybrid vehicles and electric vehicles that carry a battery for driving the vehicle in the rear portion of the vehicle body are known from the literature. When a vehicle with this type of vehicle rear structure is struck from the back in a rear-end collision, for example, the battery can move forward, contact an appropriate member (such as a suspension member) located in front of the battery, and be deformed or damaged. This vehicle rear structure must therefore be constructed to avoid contact between members when the vehicle is struck from the back (is in a rear-end collision).

Japanese Patent Laid-open Publication No. 2006-205810 discloses a vehicle rear structure having a pair of side members that extend in a vehicle front-rear direction on opposite sides of the vehicle rear with the front ends of the side members lower than the back ends, a spare tire located between the back ends of the side members, and a fuel tank disposed on the vehicle front side of the spare tire.

By creating a low rigidity zone in this vehicle rear structure by forming a notch in each side member at a position between the spare tire and the fuel tank, the side members buckle starting from this low rigidity zone when the vehicle is hit in the rear, and the front end of the spare tire is relatively separated from the rear end of the fuel tank in the vehicle up-down direction.

With the vehicle rear structure used in some hybrid vehicles and electric vehicles, the battery unit is also known to straddle vertically the rear floor panel through an opening formed in the rear floor panel. The vehicle rear structure disclosed in Japanese Patent Laid-open Publication No. 2006-205810, however, is simply a means of preventing interference between the spare tire and the fuel tank in a rear-end collision.

More specifically, Japanese Patent Laid-open Publication No. 2006-205810 does not disclose a specific configuration in the vehicle rear structure that avoids contact between the battery unit and other obstructing members in a rear-end collision.

The present invention is directed to solving the foregoing problem by providing a vehicle rear structure that can protect the battery unit in a rear-end collision.

SUMMARY OF THE DISCLOSURE

To solve the foregoing problem, a typical configuration of a vehicle rear structure according to the present invention includes a rear floor panel forming a rear floor of a hybrid vehicle or an electric vehicle; a suspension member disposed below the rear floor panel and extending in a vehicle width direction; a battery unit disposed behind the suspension member; a pair of side members disposed extending in a vehicle front-rear direction along the side edges of the rear floor panel; a first cross member disposed spanning between the pair of side members at a position below and near the front end of the rear floor panel; a second cross member disposed behind the first cross member on the underside of the rear floor panel and spanning between the pair of side members; a basically rectangular frame member that surrounds and supports the battery unit; a bridge member that is disposed spanning, in the middle of the vehicle width, from the first cross member to the second cross member, has a rear flange projecting to the rear at its rear end, and is connected by the rear flange to the second cross member; and a pair of reinforcements that are disposed inside the pair of side members and reinforce areas of the pair of side members that corresponds to from the front edge to the rear edge of the second cross member. The suspension member is positioned directly below the second cross member or forward and downward from the second cross member, and the pair of side members slope down from or near the front ends of the pair of reinforcements to the first cross member.

The behavior of the battery unit in a rear-end collision in this aspect of the invention is described below. The vehicle rear structure is described with reference to a rear zone extending from the rear end portion of the pair of side members to the second cross member, and a front zone extending from where the second cross member ends to the first cross member.

The pair of reinforcements is disposed in the rear zone where the pair of side members overlap the second cross member when seen from the side of the vehicle. The frame member that surrounds and supports the battery unit is also disposed in the rear zone. As a result, the rigidity of the rear zone is increased by the reinforcements and the frame member, and the rear zone is not easily deformed in a rear-end collision. In the front zone, the bridge member spanning from the first cross member to the second cross member is tensioned in the vehicle front-rear direction and is therefore not easily deformed in a rear-end collision.

However, because the pair of reinforcements is not on the front side of the boundary between the front zone and the rear zone, or more specifically the position where the second cross member ends, rigidity is low. Furthermore, while the bridge member has high rigidity as described above, it is connected by the low rigidity rear flange to the second cross member. The pair of side members also slope down in the front zone. As a result, when the rear zone is pushed forward by the impact of a rear-end collision, the vehicle rear structure bends and buckles upward at the boundary between the front zone and the rear zone, that is, at the position where the second cross member ends (the position where the pair of reinforcements end). More specifically, this buckling occurs at the base of the rear flange where the bridge member is not connected to the second cross member.

Because buckling occurs forward from the second cross member, the second cross member moves diagonally upward, and in conjunction therewith the battery unit supported by the frame member and located in the rear zone also moves diagonally upward instead of forward. The vehicle rear structure according to the invention therefore enables the battery unit to avoid obstructions (such as the suspension member) located directly below the second cross member or located slightly forward and downward from the second cross member in a rear-end collision. As a result, the battery unit can be protected in a rear-end collision.

It is preferable that when seen in section view from the side of the vehicle, the second cross member has an upside-down hat shape including a first flange projecting to the front, a second flange projecting to the rear, and a protrusion that protrudes down between the first flange and the second flange; and the first flange and second flange are fastened to the underside of the rear floor panel. As a result, a closed section is formed by the second cross member and the rear floor panel. The second cross member therefore offers high rigidity and is not easily deformed in a rear-end collision.

It is preferable that the rear flange of the bridge member is connected to a first flange of the second cross member. As a result, buckling occurs at the base portion of the rear flange of the bridge member where the bridge member is not connected to the front first flange of the second cross member. Buckling is therefore not impeded in a rear-end collision even though the bridge member and second cross member are connected together, and buckling occurs more reliably. The battery unit can therefore avoid contact with the obstructing suspension member in a rear-end collision.

It is preferable that the pair of reinforcements, the pair of side members, and the second cross member are joined together in three layers. Three layers of sheet metal are thus joined together where the pair of reinforcements are located, assuring greater rigidity in a rear-end collision. The vehicle rear structure can therefore bend more reliably at the position where the second cross member and pair of reinforcements end.

It is preferable that the vehicle rear structure further includes an anchor member that is positioned at the vehicle exterior side and secures an end of a seat belt, and that the anchor member is secured by the reinforcement. With this, the reinforcement determines the position where buckling occurs and can also be used as a member for securing the anchor member, thereby reducing the parts count.

It is preferable that the vehicle rear structure further includes a fuel tank mounted between the bridge member and one of the pair of side members, and an electrical component mounted between the bride member and the other of the pair of side members, and that the fuel tank and electrical component are fastened to the bridge member, the pair of side members, and the first cross member, and are not fastened to the second cross member.

With this, the fuel tank and electrical component, which are not fastened to the second cross member, are not held in tension in the vehicle front-rear direction between the first cross member and second cross member. The vehicle rear structure can therefore bend reliably at the position where the second cross member and pair of reinforcements end in a rear-end collision. The fuel tank and electrical component are also protected and not easily deformed in a rear-end collision because they are fastened to surrounding members other than the second cross member.

Moreover, it is preferable that the vehicle rear structure further includes an opening that is formed in the rear floor panel from the rear end part of the pair of side members to the second cross member, and through which the battery unit vertically straddles the rear floor panel, and that the frame member is disposed to the edge of the opening. As a result, while rigidity is reduced by forming an opening in the rear floor panel, rigidity can be increased by the frame member disposed around the edge of the opening.

A vehicle rear structure according to the invention can protect the battery unit in a rear-end collision.

DETAILED DESCRIPTION

Figure 1:
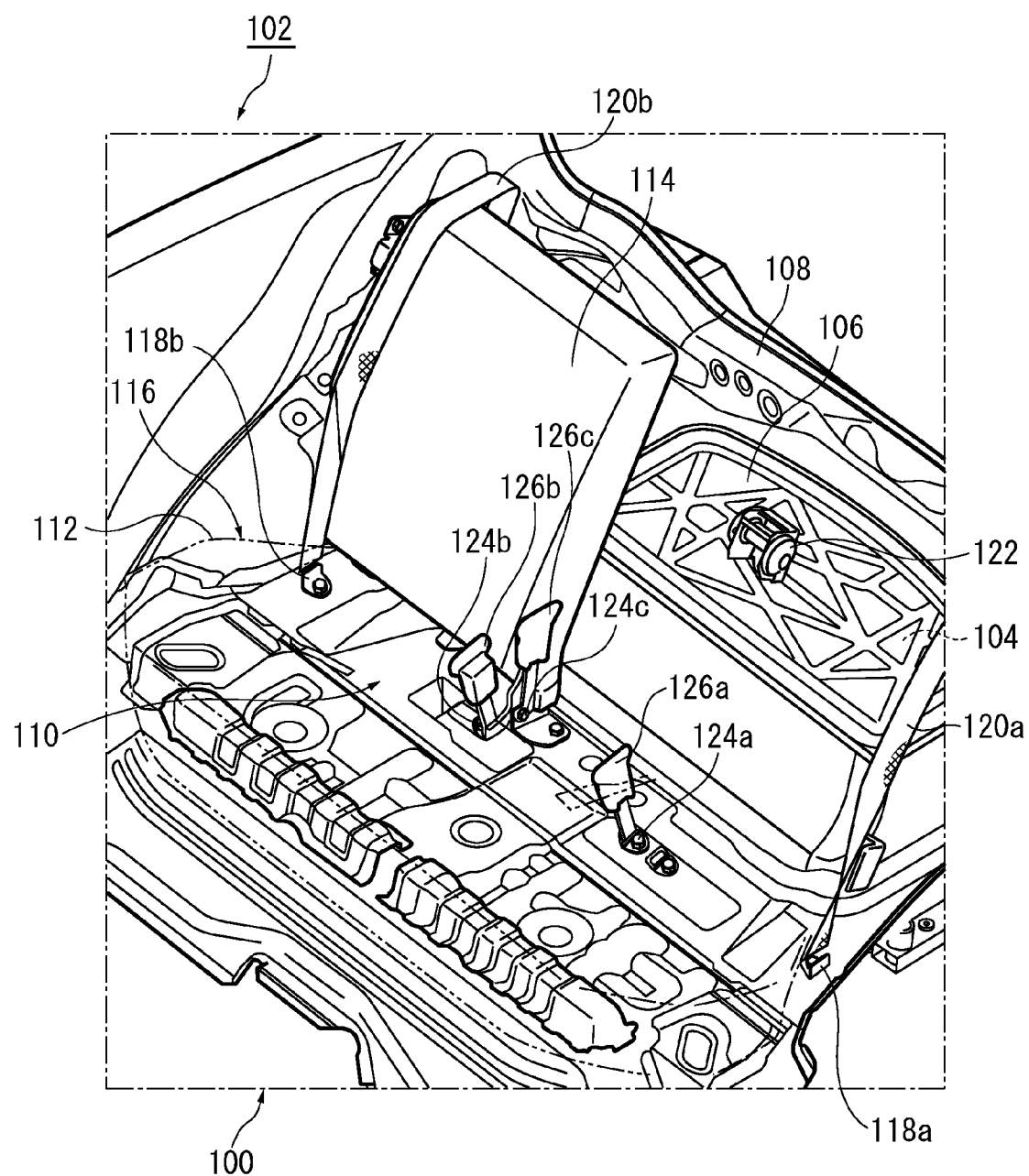
FIG. 1 shows part of a vehicle that uses the vehicle rear structure according to the invention.

A preferred embodiment of the present invention is described below in detail with reference to the accompanying figures. The dimensions, materials, and other specific values cited in the following embodiments are merely examples used to facilitate understanding the invention, and the invention is not limited thereto unless specifically noted. Elements with substantially the same function or configuration are also identified by the same reference numerals in the following description and accompanying figures, redundant description thereof is therefore omitted, and elements not directly related to the invention may also be omitted.

FIG. 1 shows part of a vehicle 102 employing the vehicle rear structure 100 according to this embodiment of the invention. This vehicle 102 is a hybrid vehicle, for example, and has a battery unit 104 for driving the vehicle installed in the vehicle rear. The top of the battery unit 104 is covered with a cover 106. Plural battery cells are stored inside the battery unit 104. A back panel 108 is disposed behind the battery unit 104.

The vehicle rear structure 100 has a rear floor panel 110 that renders the floor of the vehicle rear. A rear seat 116 including a seat cushion 112 indicated by the double-dot dash line and a seat back 114 in the figure is disposed, and seat belt anchors 118a, 118b are affixed, to the upper face of the rear floor panel 110. The seat belt anchors 118a, 118b are located at the sides of the rear floor panel 110 near the exterior of the vehicle, and respectively secure one end of a corresponding seat belt 120a, 120b. Note that the seat back 114 shown in the figure is for one person while the seat back for a two-person seat on the side of seat belt anchor 118a is not shown and only the retractor 122 installed in this seat back is shown.

The other seat belt anchors 124a, 124b, 124c, and buckles 126a, 126b, 126c supported by these seat belt anchors 124a, 124b, 124c, are disposed on the side of the vehicle center of the seat belt anchors 118a, 118b. Each of the buckles 126a, 126b mates with a tongue not shown through which the seat belt 120a, 120b passes. Buckle 126c mates with a tongue (not shown in the figure) attached to a seat belt not shown that is rewound by the above retractor 122.

With a vehicle rear structure 100 that carries the battery unit 104 in a rear portion of the vehicle body, however, the battery unit 104 is exposed to impact when the vehicle is struck from behind in a rear-end collision. If the battery unit 104 moves forward in the vehicle due to the impact in a rear-end collision, the battery unit 104 can contact an appropriate member located in front of the battery unit 104 and be deformed or damaged. This appropriate member may be a suspension member, for example, that becomes an obstruction to movement of the battery unit 104 in a rear collision.

The vehicle rear structure 100 according to this embodiment of the invention is therefore constructed to cause the vehicle body to deform in a rear-end collision so that the battery unit 104 moves diagonally upward instead of forward, thereby avoiding contact with the obstruction.

Figure 2:
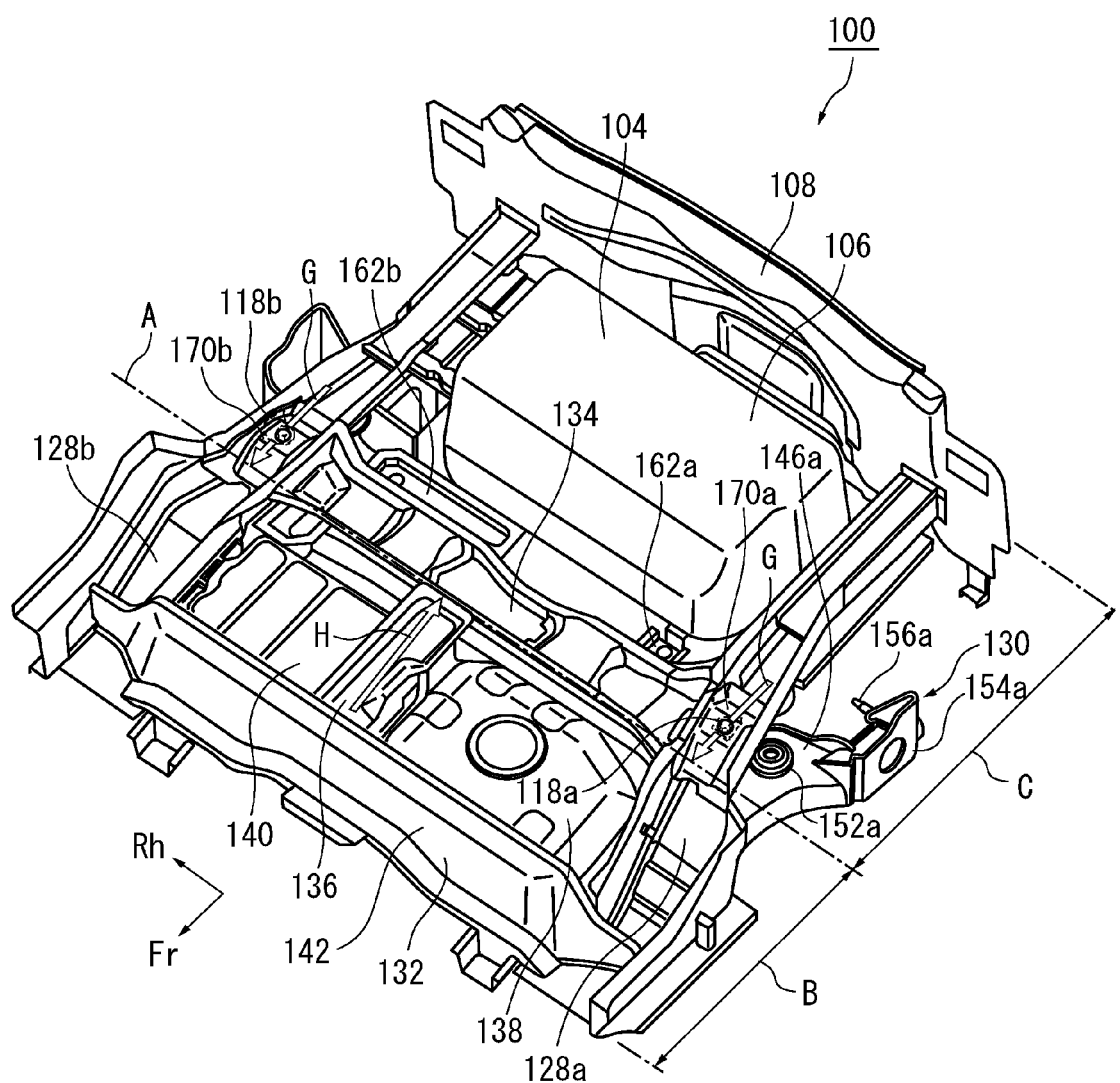
FIG. 2 shows part of the vehicle rear structure shown in FIG. 1.
Figure 3:
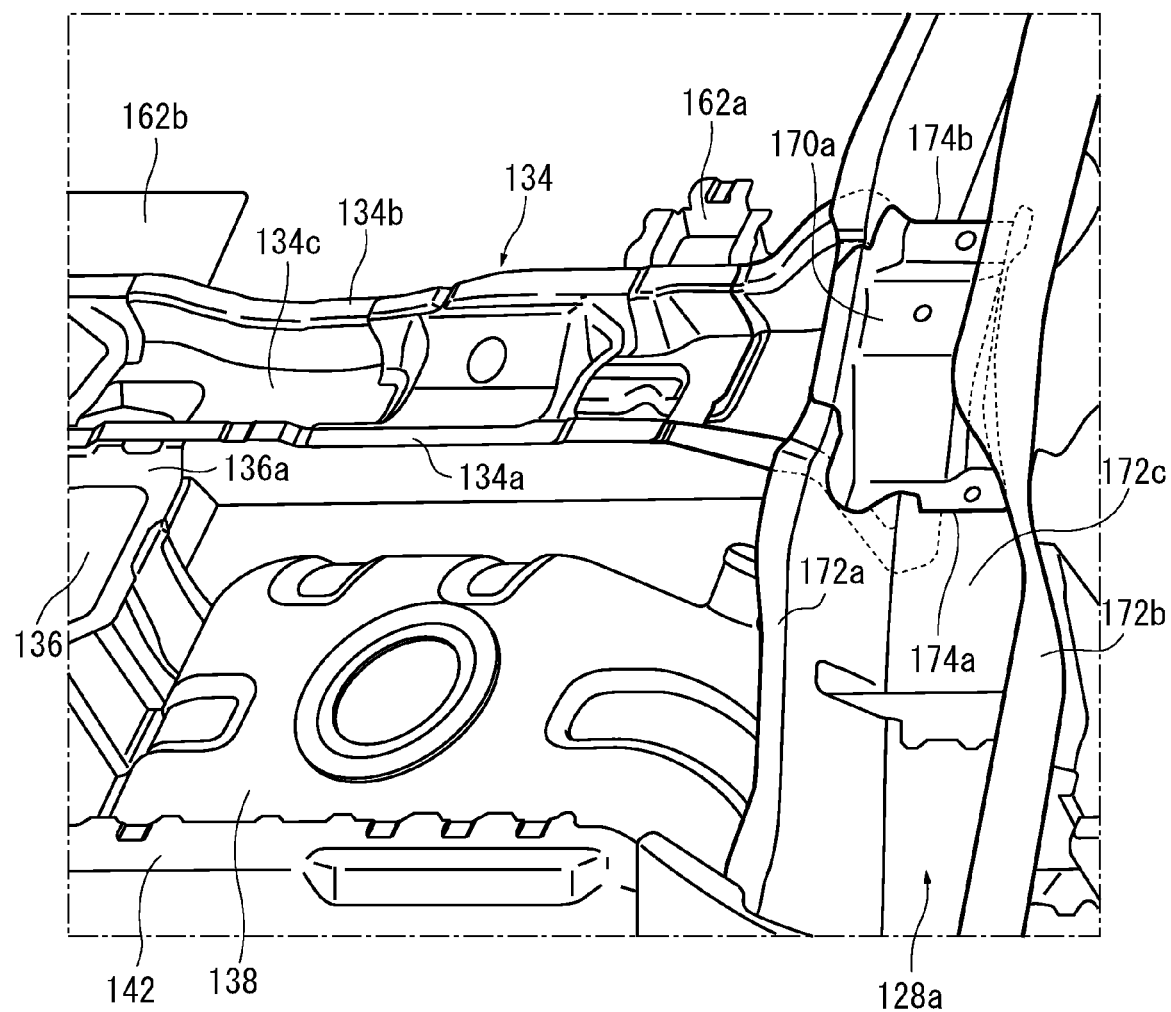
FIG. 3 shows part of the vehicle rear structure shown in FIG. 2 enlarged.
Figure 4:
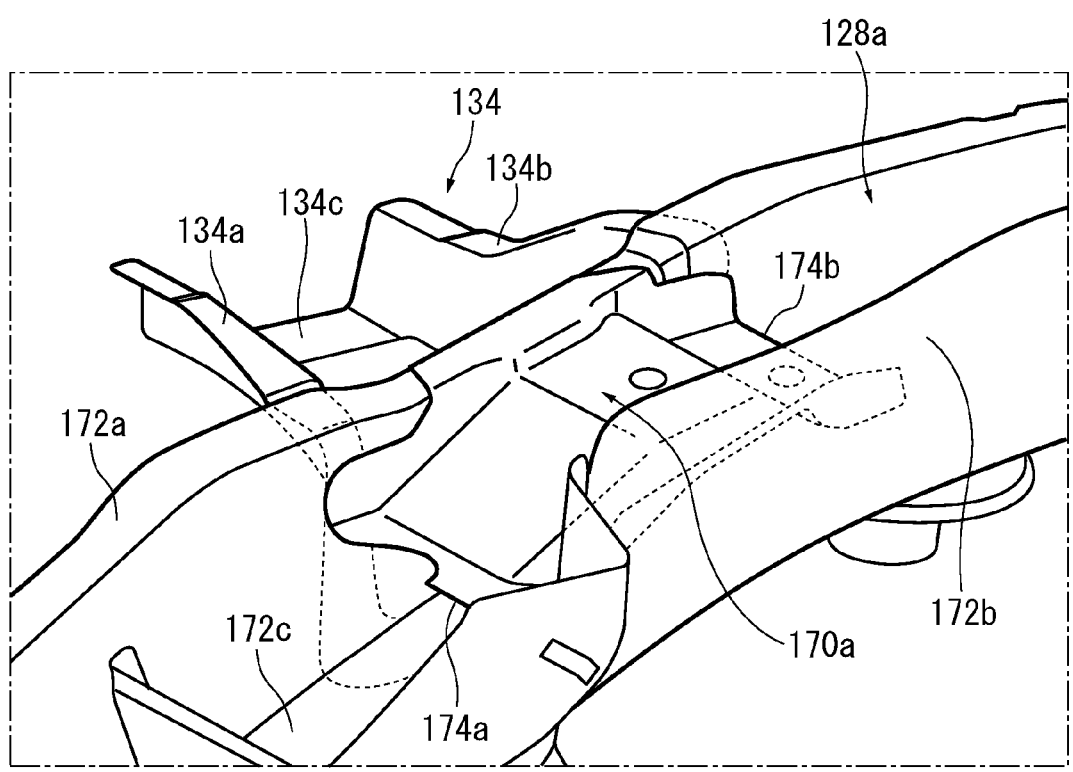
FIG. 4 is a transparent view of part of the vehicle rear structure shown in FIG. 3.

FIG. 2 shows the vehicle rear structure 100 shown in FIG. 1 with some parts omitted. More specifically, the rear floor panel 110 is omitted from the vehicle rear structure 100 shown in FIG. 1. FIG. 3 is an enlarged view of part of the vehicle rear structure 100 in FIG. 2. FIG. 4 is a transparent view of part of the vehicle rear structure 100 in FIG. 3.

In addition to the parts described above, the vehicle rear structure 100 has a pair of side members 128a, 128b, and a suspension member 130 located forward of the battery unit 104 with respect to the vehicle. The pair of side members 128a, 128b extend in the vehicle front-rear direction along the sides of the rear floor panel 110, and slope down toward the front from near the boundary line A indicated by a dot-dash line in FIG. 2.

The back panel 108 extending in the vehicle width direction spans between the pair of side members 128a, 128b near the back ends thereof. A first cross member 132 extends between the front ends of the pair of side members 128a, 128b. The first cross member 132 extends in the vehicle width below and near the front of the rear floor panel 110. A second cross member 134 also extends between the pair of side members 128a, 128b. This second cross member 134 extends in the vehicle width direction and is disposed behind the first cross member 132 on the underside of the rear floor panel 110.

As shown in FIG. 3, the second cross member 134 has a first flange 134a that projects to the front, and a second flange 134b that projects to the rear. The second cross member 134 also has a protruding part 134c that protrudes downward and is formed between the first flange 134a and second flange 134b.

Figure 6:
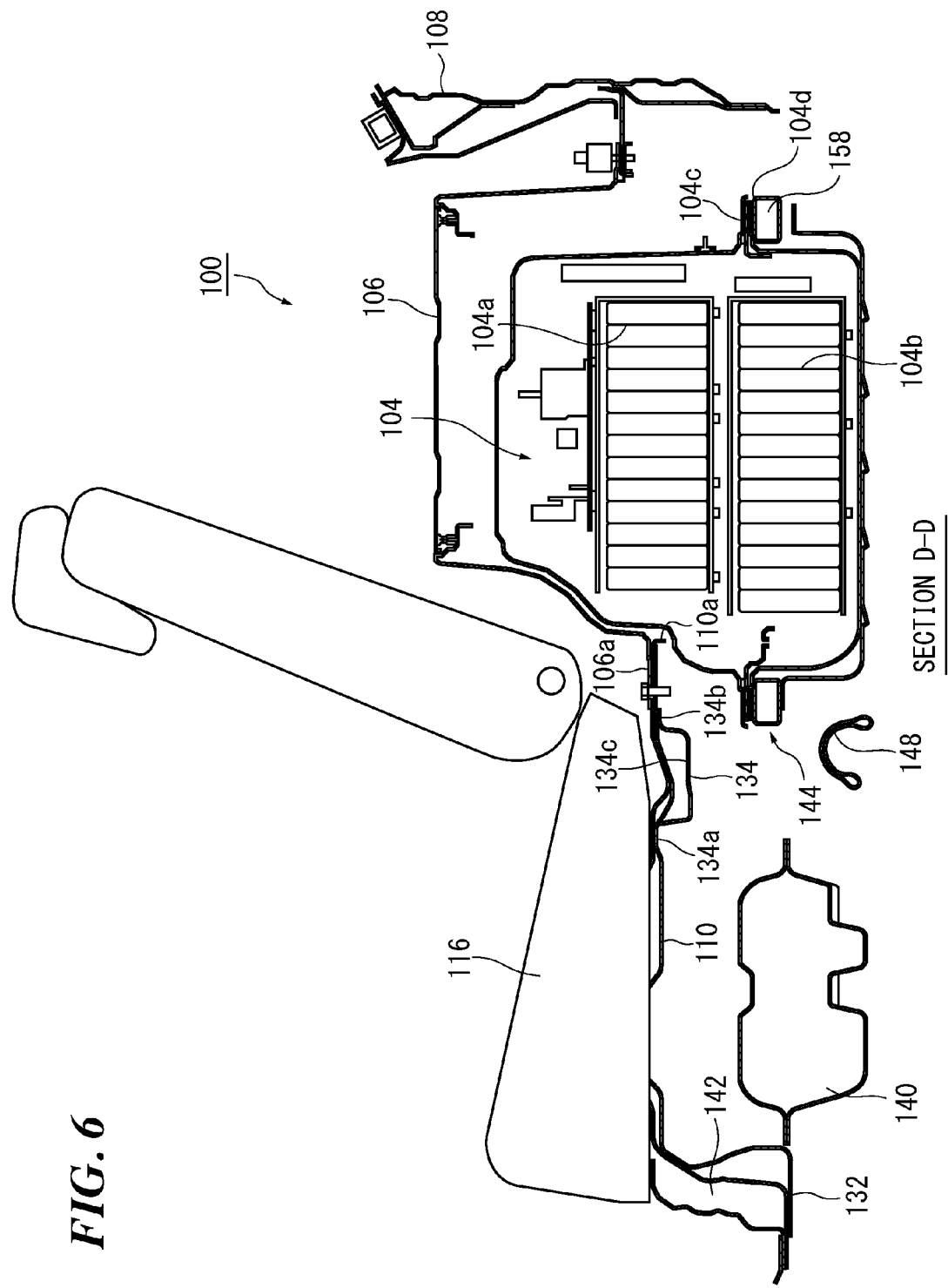
FIG. 6 is a section view through D-D in the vehicle rear structure shown in FIG. 5.

As shown in FIG. 6, the first flange 134a, second flange 134b, and protruding part 134c of the second cross member 134 thus form an upside-down hat shape when seen in section view from the side of the vehicle. The first flange 134a and second flange 134b are also fastened to the underside of the rear floor panel 110, and the second cross member 134 and rear floor panel 110 therefore form a closed section. The second cross member 134 therefore has high rigidity and is resistant to deformation in a rear-end collision.

Note that the area toward the front of the vehicle from boundary line A in FIG. 2 is referred to below as a front zone B, and the area toward the rear is referred to as a rear zone C. The rear zone C is the area from near the rear end of the pair of side members 128a, 128b to the second cross member 134. The front zone B is the area from the position where the second cross member 134 ends to the first cross member 132. When seen from the side of the vehicle, the position where the second cross member 134 ends is the position indicated by boundary line A forward from the first flange 134a where the second cross member 134 is not disposed.

The front zone B is described next. A bridge member 136, a fuel tank 138, and electrical components 140 (charging unit) including a DC-DC converter are disposed in the front zone B. The bridge member 136 is a member that spans between the first cross member 132 and second cross member 134 at a position near the center of the vehicle width.

As shown in FIG. 3, the bridge member 136 has a rear flange 136a that projects toward the rear, that is, toward the second cross member 134, from the back end of the bridge member 136. The rear flange 136a is connected to the first flange 134a of the second cross member 134, but does not extend to the protruding part 134c that forms a closed section with the second cross member 134 and rear floor panel 110.

The bridge member 136 is thus connected to the second cross member 134 by the low rigidity rear flange 136a. The bridge member 136 is a high rigidity member. The rear flange 136a is placed on the first flange 134a of the second cross member 134, and welded to the underside of the rear floor panel 110.

In addition to the rear flange 136a, the bridge member 136 also has another flange formed around substantially the entire perimeter. The front part of this flange, specifically the flange 136b projecting toward the first cross member 132 (FIG. 5), is joined to the first cross member 132.

As shown in FIG. 2, the first cross member 132 is disposed between the side members 128a, 128b at a position near the front end of the pair of side members 128a, 128b, which slope down to the front of the vehicle from near the boundary line A, and is therefore disposed at a position lower than the second cross member 134 in the vehicle up-down direction.

As shown in FIG. 6, the first cross member 132 forms a closed section in conjunction with a stepped part 142 that is formed at the back end of the main floor panel disposed in the front of the passenger cabin. The first cross member 132 therefore has high rigidity and is not easily deformed in a rear-end collision. The rear floor panel 110 is disposed behind the stepped part 142 of the main floor panel. Note that the flange 136b of the bridge member 136 is not limited to being connected to the first cross member 132, and may be joined to an appropriate member disposed to the stepped part 142 in a vehicle width direction.

The fuel tank 138 and electrical components 140 are installed on the vehicle front side of the second cross member 134, and are arranged side by side in the vehicle width direction with the bridge member 136 interposed therebetween. The fuel tank 138 and electrical components 140 are respectively disposed on the left and right sides of the bridge member 136, are not fastened to the second cross member 134, and are fastened to the first cross member 132, bridge member 136, and one of the pair of side members 128a, 128b.

Because the fuel tank 138 and electrical components 140 are not fastened to the second cross member 134, in a rear-end collision they are not held in tension in the vehicle front-rear direction between the first cross member 132 and second cross member 134. However, because the fuel tank 138 and the electrical components 140 located in the front zone B are fastened to other surrounding members not including the second cross member 134, they are resistant to deformation in a rear-end collision.

More specifically, the pair of side members 128a, 128b and the bridge member 136 are disposed in the front zone B, a closed-section structure including the first cross member 132 extends in the vehicle width direction, the front part of the bridge member 136 is joined to the first cross member 132, and rigidity is therefore high.

Figure 5:
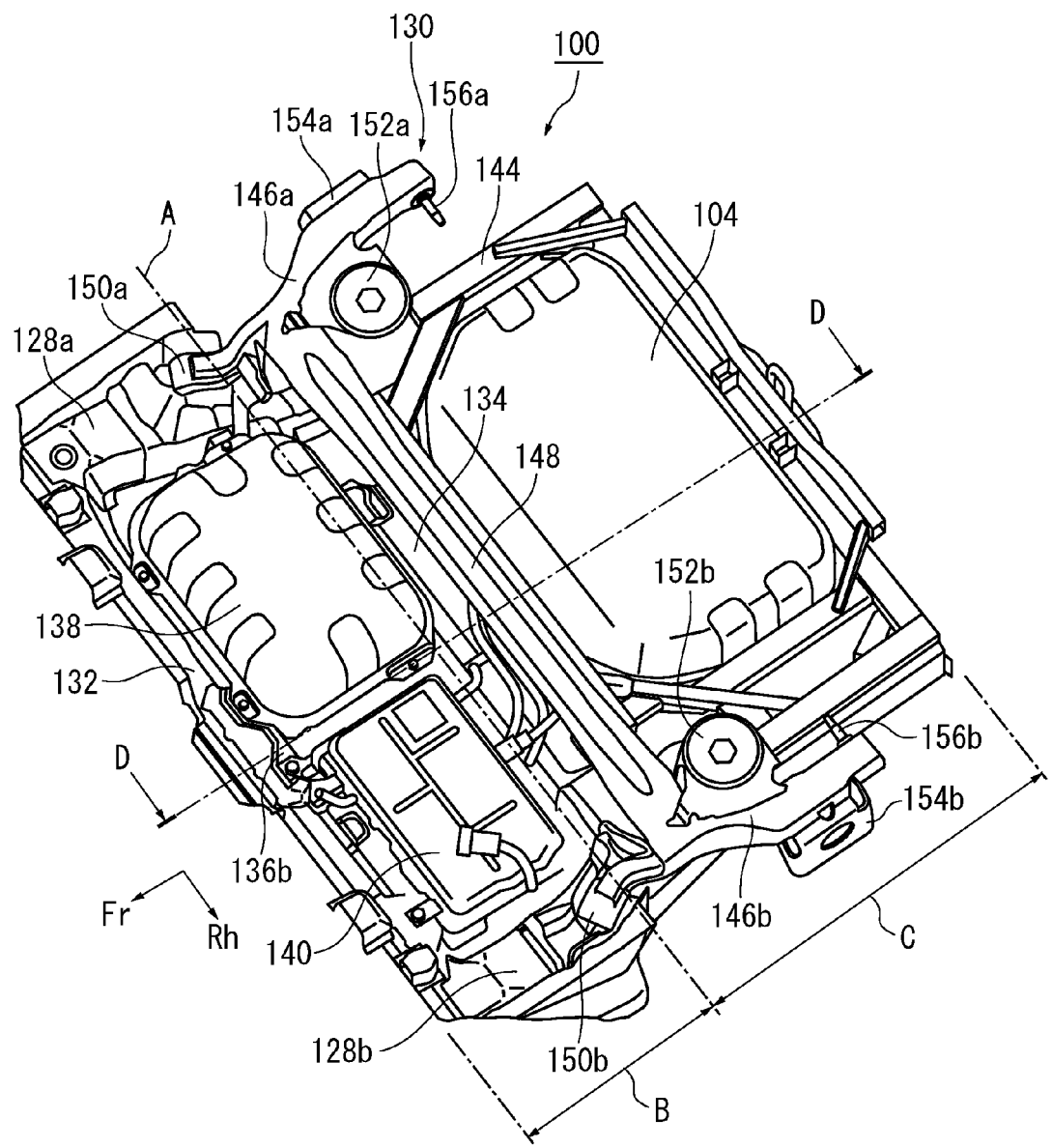
FIG. 5 shows part of the vehicle rear structure shown in FIG. 2 from below.

The rear zone C is described next. As shown in FIG. 5, the suspension member 130 described above, and a basically rectangular frame member 144 that surrounds the battery unit 104 and supports the battery unit 104, are disposed in the rear zone C. FIG. 5 shows part of the vehicle rear structure 100 shown in FIG. 2 from below. Note that the back panel 108 is not shown in FIG. 5.

The suspension member 130 has a torsion beam 148 that extends in the vehicle width direction and connects a pair of base members 146a, 146b. The pair of base members 146a, 146b are members that are supported rotatably on brackets 150a, 150b disposed to the pair of side members 128a, 128b and extend to the rear. The brackets 150*a*, 150*b* are positioned forward from the second cross member 134 in the vehicle front-rear direction.

Seats 152*a*, 152*b* that support coil springs not shown are formed rearward of and on the vehicle interior side of a portion where the base members 146*a*, 146*b* connect to the torsion beam 148. The base members 146*a*, 146*b* also have rear tire mounts 154*a*, 154*b* formed rearward of and on the vehicle exterior side of the seats 152*a*, 152*b*, and pins 156*a*, 156*b* that support shock absorbers not shown and are disposed on the vehicle interior side near the rear ends of the base members 146*a*, 146*b*.

FIG. 6 is a section view of the vehicle rear structure 100 through line D-D in FIG. 5. The torsion beam 148 is located below the rear floor panel 110 and forward of the battery unit 104 with respect to the vehicle. For example, the torsion beam 148 is disposed at a position in the vehicle front-rear direction where the rear edge of the torsion beam 148 slightly overlaps the front edge part of the frame member 144 surrounding the battery unit 104. The torsion beam 148 is also disposed at a position in the vehicle up-down direction slightly overlapping the bottom end of the battery unit 104.

The torsion beam 148 is also substantially directly below the second cross member 134, which forms a closed section with the rear floor panel 110 as described above. Note that the torsion beam 148 is not limited to a position directly below the second cross member 134, and may be positioned forward and downward from the second cross member 134.

The battery unit 104 includes an upper battery cell 104*a* and a lower battery cell 104*b*. The battery unit 104 is formed by fastening a flange 104*c* disposed at the bottom of the upper battery cell 104*a* on a flange 104*d* disposed at the top of the lower battery cell 104*b*.

The battery unit 104 and frame member 144 are rendered in unison by fastening the overlapping flanges 104*c*, 104*d* of the battery unit 104 to the top of a rail 158 of the frame member 144 with screws, for example.

The rear floor panel 110 has an opening 110*a* passing through the rear floor panel 110. The battery unit 104 is supported in unison with the frame member 144, and is mounted in the vehicle rear vertically straddling the rear floor panel 110 through the opening 110*a*.

Note that the battery unit 104 is covered from the inside of the passenger cabin by the cover 106 described above. This cover 106 has a flange 106*a* and is fastened to the rear floor panel 110 with a screw, for example. A sealant is also disposed between the flange 106*a* of the cover 106 and the rear floor panel 110, preventing water from leaking from the outside to the inside of the cabin.

Figure 7:
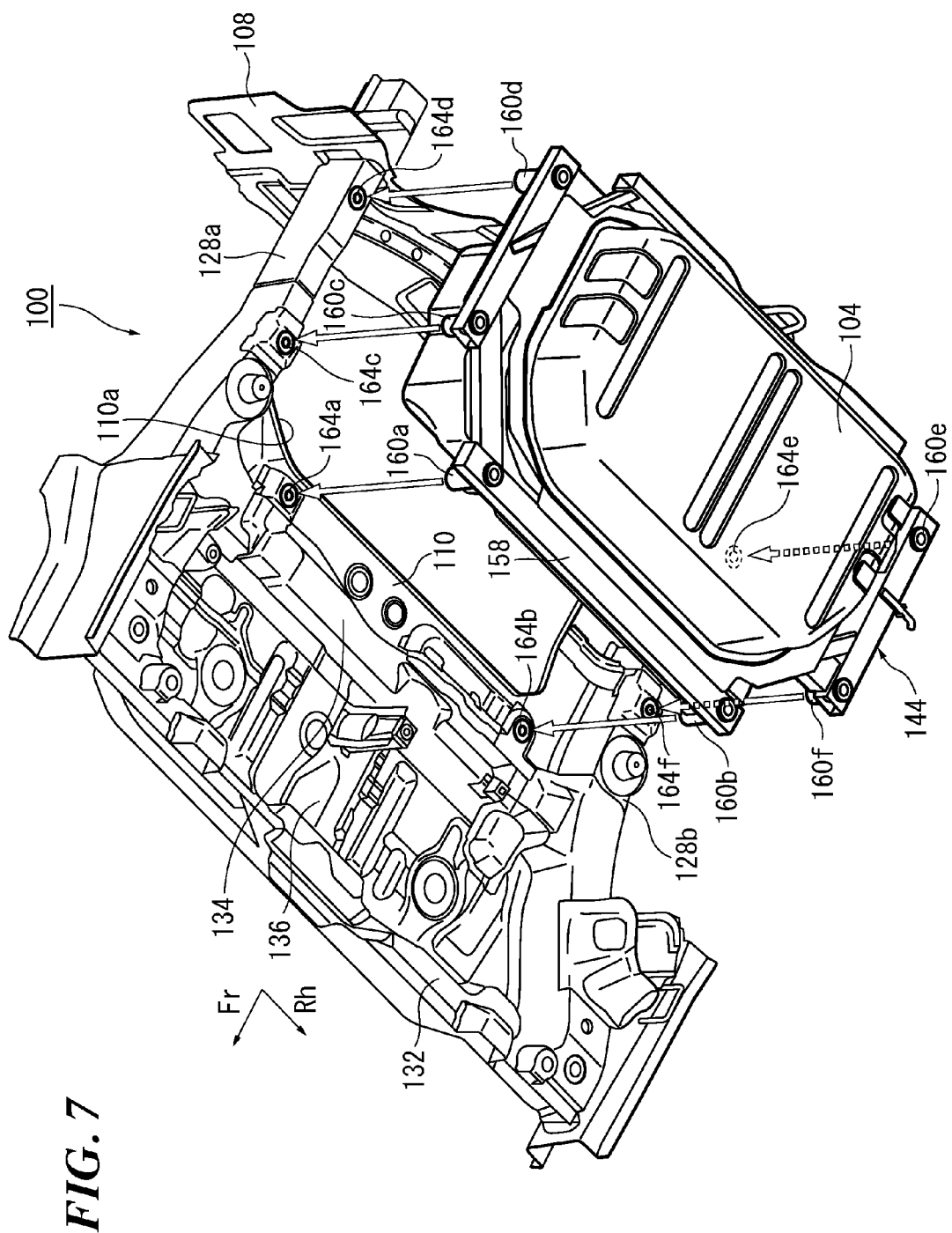
FIG. 7 is an exploded perspective view from below of part of the vehicle rear structure shown in FIG. 2.

The frame member 144 is described next with reference to FIG. 7. FIG. 7 is an exploded oblique view of the vehicle rear structure 100 shown in FIG. 2 from diagonally below with some parts omitted. FIG. 7 shows the underside of the rear floor panel 110, and omits the fuel tank 138 and electrical components 140.

As shown in the figure, a plurality of cylindrical mounts 160*a* to 160*f* are disposed projecting up from the rail 158 of the frame member 144. Mounts 160*a* and 160*b* are fastened to matching anchors 164*a*, 164*b* that are disposed to extensions 162*a*, 162*b* (see FIG. 2 and FIG. 3) of the second cross member 134 extending to the rear of the vehicle. Mounts 160*c* and 160*d* are fastened to anchors 164*c*, 164*d* disposed to side member 128*a*. Mounts 160*e* and 160*f* are fastened to the anchors 164*e*, 164*f* disposed to the side member 128*b*.

The battery unit 104 thus surrounded by and rendered in unison with the frame member 144 is installed from below the vehicle into the vehicle rear as shown in FIG. 6 through an opening 110*a* in the rear floor panel 110. Note that the frame member 144 has high overall rigidity because it is configured as a structural member. The battery unit 104 is also protected from the effects of rear-end collisions by being surrounded by a high rigidity frame member 144.

More specifically, the rigidity of the rear zone C is decreased by forming an opening 110*a* in the rear floor panel 110, but is increased by the frame member 144 disposed around the edges of the opening 110*a*.

The fuel tank 138 and electrical components 140 contained in the front zone B, and the battery unit 104 contained in the rear zone C, are thus protected by this vehicle rear structure 100 in rear-end collisions.

A pair of reinforcements 170*a*, 170*b* is also disposed inside the pair of side members 128*a*, 128*b* of the vehicle rear structure 100 as shown in FIG. 2 so that the body deforms at boundary line A. This pair of reinforcements 170*a*, 170*b* can also be used as members to secure the seat belt anchors 118*a*, 118*b* (see FIG. 1) indicated by dotted lines in FIG. 2, thereby reducing the parts count.

The side member 128*a*, second cross member 134, and reinforcement 170*a* are described next with reference to FIG. 3 and FIG. 4. Note that the other side member 128*b* and reinforcement 170*b* are configured identically to side member 128*a* and reinforcement 170*a*, and further description thereof is therefore omitted.

As shown in FIG. 3, the side member 128*a* has flanges 172*a* and 172*b* formed respectively on the vehicle interior and exterior sides thereof, and a protruding part 172*c* that protrudes down, and is shaped like an upside-down hat when seen in the vehicle width direction. As shown in FIG. 4, the end of the second cross member 134 together with the first flange 134*a* and second flange 134*b* extend along the underside of the side member 128*a*, and the side member 128*a* rests thereon.

As shown in FIG. 3, the reinforcement 170*a* extends in the vehicle front-rear direction in the area corresponding to from the first flange 134*a* at the front side to the second flange 134*b* at the rear side of the second cross member 134. More specifically, when seen from the side of the vehicle, the front end 174*a* and back end 174*b* of the reinforcement 170*a* are at substantially the same positions as the front and back edges of the second cross member 134. The reinforcement 170*a* thus reinforces the side member 128*a* in this area.

As shown in FIG. 4, the reinforcement 170*a* is set from above into the protruding part 172*c*, which is the inside of the side member 128*a*. As a result, the reinforcement 170*a*, side member 128*a*, and second cross member 134 are joined together in three layers. Because three layers of metal are thus joined in layers where the pair of reinforcements 170*a*, 170*b* are disposed, greater rigidity is assured in a rear-end collision, and deformation is difficult in a rear-end collision.

However, because a pair of reinforcements 170*a*, 170*b* as shown in FIG. 3 is not disposed to the pair of side members 128*a*, 128*b* forward from the boundary line A shown in FIG. 2 (that is, the position where the second cross member 134 ends), rigidity is low. The rigidity of the pair of side members 128*a*, 128*b* therefore changes at this boundary line A.

Figure 8A:
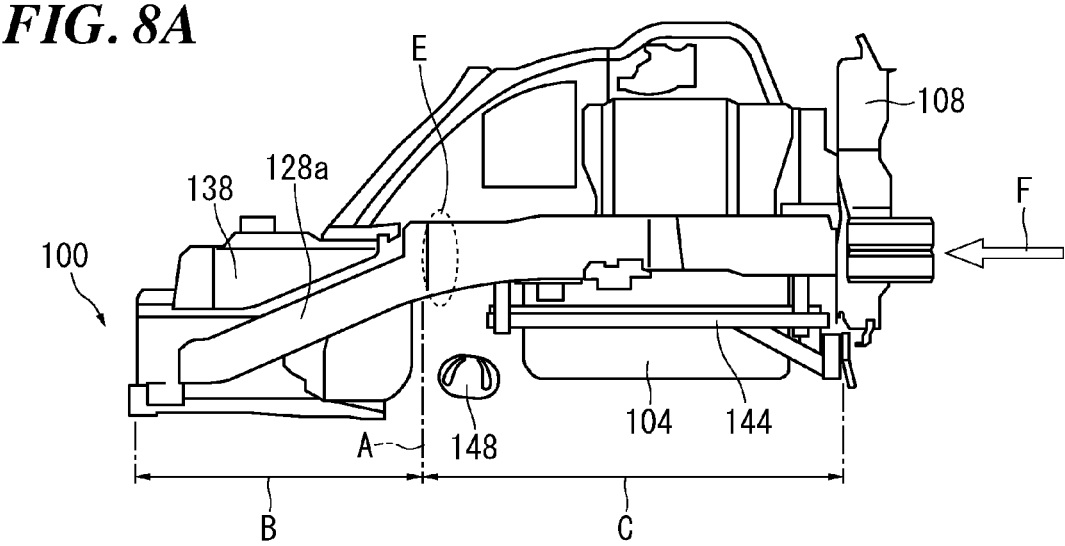
FIGS. 8A, 8B and 8C show an example of deformation of the vehicle rear structure shown in FIG. 2 in a rear-end collision.
Figure 8B:
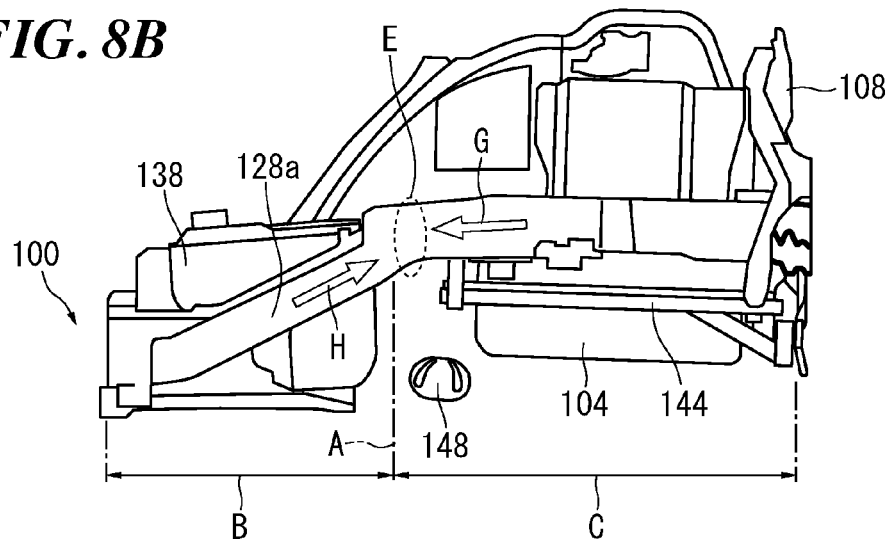
Figure 8C:
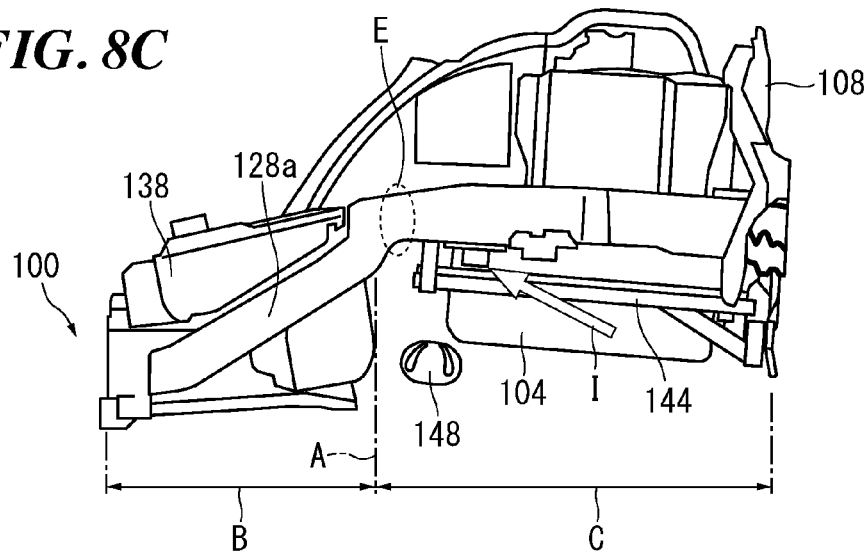

The behavior of the battery unit 104 in a rear-end collision is described next with reference to FIG. 2 and FIGS. 8A, 8B and 8C. FIGS. 8A, 8B and 8C illustrate deformation of the vehicle rear structure 100 shown in FIG. 2 in a rear-end collision. Area E indicated by the dotted line in the figure shows where the second cross member 134 and pair of reinforcements 170*a*, 170*b* join the pair of side members 128*a*, 128*b* when seen from the side of the vehicle. This means that boundary line A is located forward of an area E. Note also that the area E is in the rear zone C.

When the back panel 108 receives an impact denoted by arrow F in a rear-end collision as shown in FIG. 8A, the force of impact is transferred to the pair of side members 128a, 128b as indicated by arrows G in FIG. 2 and FIG. 8B.

The second cross member 134 and pair of reinforcements 170a, 170b are not disposed to the pair of side members 128a, 128b in the front zone B. The rigidity of the pair of side members 128a, 128b is therefore lower in the front zone B than the area E. The pair of side members 128a, 128b also slope down in the front zone B to the first cross member 132. In addition, the high rigidity bridge member 136 is connected to the second cross member 134 only by the low rigidity rear flange 136a shown in FIG. 3.

The vehicle rear structure 100 is therefore subject to the impact indicated by arrows H in FIG. 2 and FIG. 8B in addition to the impact indicated by arrows G. As a result, when the rear zone C moves forward, the vehicle rear structure 100 bends and buckles upward at the position of the boundary line A between the front zone B and the rear zone C, that is, the position where the second cross member 134 and pair of reinforcements 170a, 170b end, as shown in FIG. 8C. This buckling occurs in the bridge member 136 at the base of the rear flange 136a where there is no overlap with the first flange 134a of the second cross member 134.

Because this buckling occurs forward from the second cross member 134, the second cross member 134 moves diagonally upward. In conjunction with this movement of the second cross member 134, the battery unit 104 supported by the frame member 144 in the rear zone C also moves diagonally upward as indicated by arrow I in FIG. 8C instead of forward.

In a rear-end collision, this vehicle rear structure 100 thus enables the battery unit 104 to avoid obstructions, such as the torsion beam 148 of the suspension member 130, that are located directly below the second cross member 134 or located forward and downward from the second cross member 134. As a result, the battery unit 104 can be protected in a rear-end collision.

The vehicle 102 in the foregoing embodiment is a hybrid vehicle, but the invention is not so limited and the vehicle 102 may be an electric vehicle having a battery unit 104 installed in the vehicle rear. The battery unit 104 can also be protected in a rear-end collision when the vehicle rear structure 100 described above is used in an electric vehicle. An opening 110a is formed in the rear floor panel 110 in the embodiment described above, but the invention is not so limited. For example, the vehicle may support the battery unit 104 below the rear floor panel 110 without forming an opening 110a.

A preferred embodiment of the present invention is described above with reference to accompanying figures, but the invention is not so limited. Other variations and improvements will be obvious to one with ordinary skill in the related art without departing from the scope of the accompanying claims, and all such variations and improvements are obviously included in the scope of technology disclosed by the invention.

The invention can be used in the vehicle rear structure of a hybrid vehicle or an electric vehicle.

The invention claimed is:

1. A vehicle rear structure comprising:
a rear floor panel forming a rear floor of a hybrid vehicle;
a suspension member disposed below the rear floor panel and extending in a vehicle width direction;
a battery unit disposed behind the suspension member;
a pair of side members disposed extending in a vehicle front-rear direction alongside edges of the rear floor panel;
a first cross member spanning between the pair of side members at a position below and near a front end of the rear floor panel;
a second cross member disposed behind the first cross member on an underside of the rear floor panel and spanning between the pair of side members;
a rectangular frame member that surrounds and supports the battery unit;
a bridge member that is disposed spanning, in the middle of the vehicle width, from the first cross member to the second cross member, has a rear flange projecting to the rear at its rear end, and is connected by the rear flange to the second cross member;
a pair of reinforcements that are disposed inside the pair of side members and reinforce areas of the pair of side members that correspond to from a front edge to a rear edge of the second cross member;
a fuel tank mounted between the bridge member and one of the pair of side members; and
an electrical component mounted between the bridge member and the other of the pair of side members;
wherein the suspension member is positioned directly below the second cross member or positioned forward and downward from the second cross member,
wherein the pair of side members slopes down from or near front ends of the pair of reinforcements to the first cross member, and
wherein the fuel tank and the electrical component are fastened to the bridge member, the pair of side members, and the first cross member, and not fastened to the second cross member.

2. A vehicle rear structure comprising:
a rear floor panel forming a rear floor of a hybrid vehicle;
a suspension member disposed below the rear floor panel and extending in a vehicle width direction;
a battery unit disposed behind the suspension member;
a pair of side members disposed extending in a vehicle front-rear direction alongside edges of the rear floor panel;
a first cross member spanning between the pair of side members at a position below and near a front end of the rear floor panel;
a second cross member disposed behind the first cross member on an underside of the rear floor panel and spanning between the pair of side members;
a rectangular frame member that surrounds and supports the battery unit;
a bridge member that is disposed spanning, in the middle of the vehicle width, from the first cross member to the second cross member, has a rear flange projecting to the rear at its rear end, and is connected by the rear flange to the second cross member;
a pair of reinforcements that are disposed inside the pair of side members and reinforce areas of the pair of side members that correspond to from a front edge to a rear edge of the second cross member;
a fuel tank mounted between the bridge member and one of the pair of side members; and
an electrical component mounted between the bridge member and the other of the pair of side members;
wherein the suspension member is positioned directly below the second cross member or positioned forward and downward from the second cross member, wherein the pair of side members slopes down from or near front ends of the pair of reinforcements to the first cross member, wherein the second cross member has an upside-down hat shape including a first flange projecting to the front, a second flange projecting to the rear, and a protrusion that protrudes down between the first flange and the second flange, wherein the first flange and the second flange are fastened to the underside of the rear floor panel, and wherein the fuel tank and the electrical component are fastened to the bridge member, the pair of side members, and the first cross member, and not fastened to the second cross member.

3. A vehicle rear structure comprising:

a rear floor panel forming a rear floor of a hybrid vehicle;

a suspension member disposed below the rear floor panel and extending in a vehicle width direction;

a battery unit disposed behind the suspension member;

a pair of side members disposed extending in a vehicle front-rear direction alongside edges of the rear floor panel;

a first cross member spanning between the pair of side members at a position below and near a front end of the rear floor panel;

a second cross member disposed behind the first cross member on an underside of the rear floor panel and spanning between the pair of side members;

a rectangular frame member that surrounds and supports the battery unit;

a bridge member that is disposed spanning, in the middle of the vehicle width, from the first cross member to the second cross member, has a rear flange projecting to the rear at its rear end, and is connected by the rear flange to the second cross member;

a pair of reinforcements that are disposed inside the pair of side members and reinforce areas of the pair of side members that correspond to from a front edge to a rear edge of the second cross member;

a fuel tank mounted between the bridge member and one of the pair of side members; and an electrical component mounted between the bridge member and the other of the pair of side members;

wherein the suspension member is positioned directly below the second cross member or positioned forward and downward from the second cross member, wherein the pair of side members slopes down from or near front ends of the pair of reinforcements to the first cross member, wherein the second cross member has an upside-down hat shape including a first flange projecting to the front, a second flange projecting to the rear, and a protrusion that protrudes down between the first flange and the second flange, wherein the first flange and the second flange are fastened to the underside of the rear floor panel, wherein the rear flange of the bridge member is connected to a first flange of the second cross member, and wherein the fuel tank and the electrical component are fastened to the bridge member, the pair of side members, and the first cross member, and not fastened to the second cross member.

4. A vehicle rear structure comprising:

a rear floor panel forming a rear floor of a hybrid vehicle;

a suspension member disposed below the rear floor panel and extending in a vehicle width direction;

a battery unit disposed behind the suspension member;

a pair of side members disposed extending in a vehicle front-rear direction alongside edges of the rear floor panel;

a first cross member spanning between the pair of side members at a position below and near a front end of the rear floor panel;

a second cross member disposed behind the first cross member on an underside of the rear floor panel and spanning between the pair of side members;

a rectangular frame member that surrounds and supports the battery unit;

a bridge member that is disposed spanning, in the middle of the vehicle width, from the first cross member to the second cross member, has a rear flange projecting to the rear at its rear end, and is connected by the rear flange to the second cross member;

a pair of reinforcements that are disposed inside the pair of side members and reinforce areas of the pair of side members that correspond to from a front edge to a rear edge of the second cross member;

a fuel tank mounted between the bridge member and one of the pair of side members; and an electrical component mounted between the bridge member and the other of the pair of side members;

wherein the suspension member is positioned directly below the second cross member or positioned forward and downward from the second cross member, wherein the pair of side members slopes down from or near front ends of the pair of reinforcements to the first cross member, wherein the pair of reinforcements, the pair of side members, and the second cross member are joined together in three layers, and wherein the fuel tank and the electrical component are fastened to the bridge member, the pair of side members, and the first cross member, and not fastened to the second cross member.

5. A vehicle rear structure comprising:

a rear floor panel forming a rear floor of a hybrid vehicle;

a suspension member disposed below the rear floor panel and extending in a vehicle width direction;

a battery unit disposed behind the suspension member;

a pair of side members disposed extending in a vehicle front-rear direction alongside edges of the rear floor panel;

a first cross member spanning between the pair of side members at a position below and near a front end of the rear floor panel;

a second cross member disposed behind the first cross member on an underside of the rear floor panel and spanning between the pair of side members;

a rectangular frame member that surrounds and supports the battery unit;

a bridge member that is disposed spanning, in the middle of the vehicle width, from the first cross member to the second cross member, has a rear flange projecting to the rear at its rear end, and is connected by the rear flange to the second cross member; and a pair of reinforcements that are disposed inside the pair of side members and reinforce areas of the pair of side members that correspond to from a front edge to a rear edge of the second cross member;

an anchor member that is positioned at a vehicle exterior side and secures an end of a seat belt;

a fuel tank mounted between the bridge member and one of the pair of side members; and an electrical component mounted between the bridge member and the other of the pair of side members;
wherein the suspension member is positioned directly below the second cross member or positioned forward and downward from the second cross member,
wherein the pair of side members slopes down from or near front ends of the pair of reinforcements to the first cross member,
wherein the anchor member is secured by the pair of reinforcements, and
wherein the fuel tank and the electrical component are fastened to the bridge member, the pair of side members, and the first cross member, and not fastened to the second cross member.

* * * * *